F. N. CONNET.
RATE REGULATING DEVICE FOR FLUIDS.
APPLICATION FILED OCT. 3, 1907.
930,158.
Patented Aug. 3, 1909.
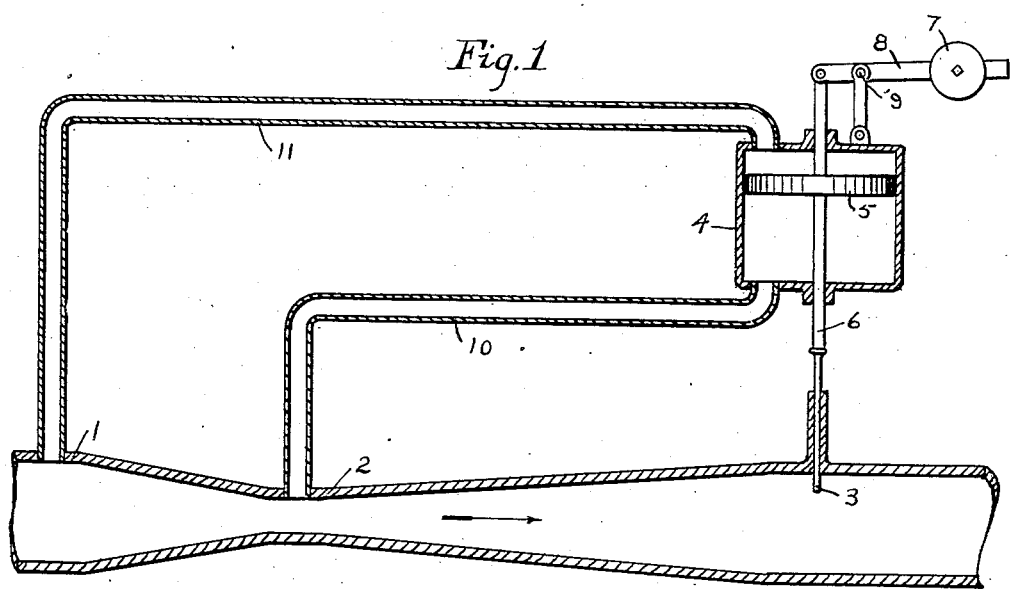
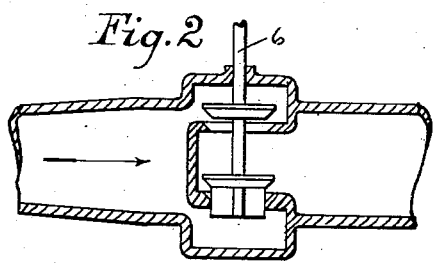
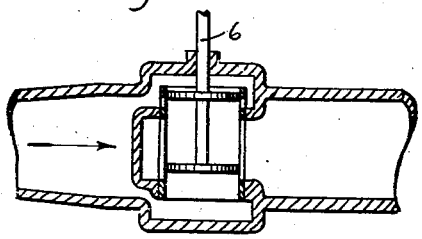
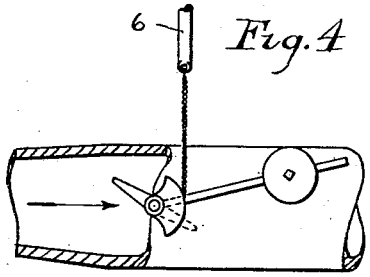
Witnesses
John F. Cavanagh
E. J. Ogden
Inventor
Frederick N. Connet
By
Howard E. Barlow
Attorney

UNITED STATES PATENT OFFICE.

FREDERICK N. CONNET, OF PROVIDENCE, RHODE ISLAND.

RATE-REGULATING DEVICE FOR FLUIDS.

No. 930,158.　　　　　Specification of Letters Patent.　　　　　Patented Aug. 3, 1909.

Application filed October 3, 1907. Serial No. 395,735.

*To all whom it may concern:*

Be it known that I, FREDERICK N. CONNET, a citizen of the United States, residing at the city of Providence, in the county of Providence and State of Rhode Island, have invented certain new and useful Improvements in Rate-Regulating Devices for Fluids, of which the following is a specification, reference being had therein to the accompanying drawing.

This invention has for its object to provide a simple and effective device for automatically controlling the rate of flow of liquids or gases through a given aperture.

This device may be used for any desired purpose but the same is more particularly designed for use in controlling the rate of flow from a reservoir or the like from which large quantities of water are used.

On account of the constantly changing condition of the filter beds, as well as from various other causes, the pressure which controls the rate of flow of the effluent is continually varying and it is found necessary in order to maintain a constant delivery to provide a valve, or the like, in the effluent pipe and automatically control the opening through said pipe through mechanism actuated by the differential pressures at two points in said pipe.

In carrying out my present invention I provide an arrangement somewhat simplified from that illustrated in my patent numbered 863,264, in which present application the valve actuating piston is connected directly to the throat or reduced portion of the tube on one side and to the up-stream or high-pressure side of the tube on the opposite side, whereby the difference between the pressures at these two points of the main is caused to actuate said piston to move the valve and control the opening whereby the rate of flow through said main is regulated.

With these objects in view, the invention consists of certain novel features of construction, as will be more fully described and particularly pointed out in the appended claims.

In the accompanying drawings: Figure 1—illustrates a diagrammatic view of the apparatus partly in section illustrating a simplified form and the operation of the same. Figs. 2, 3 and 4 show different styles or types of balanced valves, namely, the double puppet, the piston and the butterfly, which may be operated by a piston to control the flow through the main.

Referring to the drawings at 1 is the main pipe provided with a contracted throat portion 2, which construction is similar to that of the well known Venturi-tube. Located on the down-stream side of this throat is shown a gate valve 3 adapted to be supported in any convenient way to be raised and lowered into and out of said tube so as to control the opening therein, but I do not confine myself to this particular style of valve, as any valve, whether balanced or otherwise, may be used for controlling the opening through this pipe. A cylinder 4 in which the piston 5 is adapted to reciprocate may be located adjacent the said valve 3, or in any other convenient place. A rod 6 may be connected to said piston in any convenient way and is shown as passing down through the lower end of the cylinder 4, at which point it is connected to the upper end of the valve 3. Said rod is also shown as extending up through the head of the cylinder 4 where the same is connected to the counterbalance weight 7 through the arm 8 which is pivoted at 9 whereby the weight of the piston and the valve may be nicely counterbalanced, and the valve normally held in its open position, if desired.

At 10 is a pipe leading from the throat 2 of the tube to the lower side of the piston 5, while the upper end of the cylinder 4 is connected by the pipe 11 to the up-stream or high pressure portion of said tube whereby the pressures at these two distinct points in this pipe are communicated to opposite sides of the piston 5.

The operation of the apparatus may be more clearly described as follows: The liquids or gases used are forced through the main pipe in the direction of the arrow, said pipe being provided with a contracted portion forming a throat which acts in such a manner upon the fluid passing through that the pressure is less at the throat than at the enlarged portion on the up-stream side of the same, and the greater the velocity, the greater the difference of pressures at these two points.

It is found where water is used in large quantities, such as that flowing from a city reservoir or the like, that the rate of flow is apt to vary from a variety of causes, and that it is very desirable to arrange means whereby this rate may be automatically controlled so that the city supply will be more uniform. In order to accomplish this in the simplest possible manner I have provided a cylinder containing a piston, the same being connected to a valve adapted to control the opening through the main, the reduced pressure from the throat portion of said pipe is conducted to one side of said piston, while the higher pressure from the up-stream portion of the pipe is conducted to the opposite side of the piston, said piston and valves being normally held in their raised or opened position by means of the counterweight 7. As soon as the flow begins through the tube the greater pressure will naturally act upon the piston and force it down to close the valve a slight distance. An increase from this rate of flow will cause a greater pressure to further close the valve, while when the rate of flow is reduced the pressures are nearer equalized and the valve will again be raised to keep the rate of flow constant.
The device constructed to operate in the manner illustrated is extremely simple and practical in its operation and by its use the flow of large quantities through a pipe may be automatically controlled and nicely regulated so that the delivery shall be at a substantially uniform rate.

Having thus described my invention, what I claim as new and desire to secure by Letters Patent, is:

1. A device of the character described comprising a main pipe having a reduced portion or throat, a valve in said pipe, a piston for operating said valve, a counterbalance for said piston and valve, and means whereby said piston is controlled in its action by said counterbalance and the differential pressures in said main to automatically regulate the rate of flow through said main.

2. A device of the character described comprising a main pipe having a reduced portion or throat, a valve in said pipe, an operating piston connected to said valve, an adjustable counterbalancing weight acting on said piston and valve to hold the latter normally open, and means whereby the high pressure portion of the main is adapted to communicate with one side of said piston and the low pressure portion with the opposite side of said piston, whereby said piston is operated to automatically determine the position of said valve and control the rate of flow through the main.

In testimony whereof I affix my signature in presence of two witnesses.

FREDERICK N. CONNET.

Witnesses:
Wm. R. Tillinghast,
Howard E. Barlow.